(12) United States Patent
Taylor et al.

(10) Patent No.: US 7,803,274 B2
(45) Date of Patent: Sep. 28, 2010

(54) CONTAINED LIQUID MEMBRANE CONTACTOR AND A METHOD OF MANUFACTURING THE SAME

(75) Inventors: Gareth Peter Taylor, Indian Trail, NC (US); Amitava Sengupta, Charlotte, NC (US); Timothy D. Price, Monroe, NC (US); Linus I. Holstein, Salisbury, NC (US); Tony R. Vido, Belmont, NC (US)

(73) Assignee: Celgard LLC, Charlotte, NC (US)

( * ) Notice: Subject to any disclaimer, the term of this patent is extended or adjusted under 35 U.S.C. 154(b) by 0 days.

(21) Appl. No.: 12/112,071

(22) Filed: Apr. 30, 2008

(65) Prior Publication Data

US 2009/0272684 A1   Nov. 5, 2009

(51) Int. Cl.
*B01D 63/00* (2006.01)
*C02F 1/44* (2006.01)

(52) U.S. Cl. ............ 210/321.81; 210/511; 210/321.78; 210/321.8; 210/500.23

(58) Field of Classification Search ............ 210/500.23, 210/321.79, 321.8, 321.88, 321.89, 321.9, 210/323.5, 511, 640, 650, 651, 321.75, 321.76, 210/321.84, 321.85
See application file for complete search history.

(56) References Cited

U.S. PATENT DOCUMENTS

| | | | | |
|---|---|---|---|---|
| 3,536,611 A | * | 10/1970 | De Filippi et al. | 210/646 |
| 3,554,379 A | * | 1/1971 | Pye | 210/321.8 |
| 4,220,535 A | * | 9/1980 | Leonard | 210/321.89 |
| 4,451,369 A | * | 5/1984 | Sekino et al. | 210/321.9 |
| 4,670,145 A | * | 6/1987 | Edwards | 210/321.87 |
| 4,940,617 A | * | 7/1990 | Baurmeister | 428/36.3 |
| 5,013,437 A | * | 5/1991 | Trimmer et al. | 210/321.78 |
| 5,026,479 A | * | 6/1991 | Bikson et al. | 210/321.8 |
| 5,071,552 A | * | 12/1991 | Bikson et al. | 210/321.8 |
| 5,352,361 A | * | 10/1994 | Prasad et al. | 210/321.81 |
| 5,470,469 A | * | 11/1995 | Eckman | 210/321.8 |
| 5,525,144 A | * | 6/1996 | Gollan | 96/8 |
| 5,580,452 A | | 12/1996 | Lin | |
| 5,714,072 A | * | 2/1998 | Reed et al. | 210/644 |
| 5,938,922 A | | 8/1999 | Fulk, Jr. et al. | |
| 6,113,782 A | * | 9/2000 | Leonard | 210/321.89 |
| 6,149,817 A | * | 11/2000 | Peterson et al. | 210/644 |
| 6,214,232 B1 | * | 4/2001 | Baurmeister et al. | 210/651 |

(Continued)

FOREIGN PATENT DOCUMENTS

EP   1864709 A   12/2007

(Continued)

*Primary Examiner*—Tony G Soohoo
*Assistant Examiner*—David C Mellon
(74) *Attorney, Agent, or Firm*—Hammer & Associates, P.C.

(57) ABSTRACT

A contained liquid membrane contactor includes a perforated center tube, first and second membrane mats each with a first and a second end both being open, four tube sheets affixing the membrane mats to the center tube, a shell sealed to the tube sheets, and two end caps. The first end of the first mat extends a first distance beyond the second end of the second mat. The first end of the first mat is open at the first tube sheet while the first end of the second mat is open at the second tube sheet. The second end of the first mat is between the second and fourth tube sheets and the second end of the second mat is between the first and third tube sheets.

10 Claims, 4 Drawing Sheets

U.S. PATENT DOCUMENTS

| | | | |
|---|---|---|---|
| 6,402,818 B1 * | 6/2002 | Sengupta | 96/6 |
| 6,485,650 B1 * | 11/2002 | Bhown | 210/643 |
| 6,616,841 B2 * | 9/2003 | Cho et al. | 210/321.83 |
| 6,632,356 B2 * | 10/2003 | Hallan et al. | 210/321.6 |
| 2006/0081524 A1 * | 4/2006 | Sengupta et al. | 210/321.88 |
| 2006/0081624 A1 | 4/2006 | Sengupta et al. | |

FOREIGN PATENT DOCUMENTS

| | | | |
|---|---|---|---|
| JP | 2006247438 A | * | 9/2006 |
| WO | WO 98/07491 A | | 2/1998 |
| WO | WO 98/33581 A | | 8/1998 |
| WO | WO 00/06357 A | | 2/2000 |

* cited by examiner

CONTAINED LIQUID MEMBRANE CONTACTOR AND A METHOD OF MANUFACTURING THE SAME

FIELD OF INVENTION

The instant application relates to a contained liquid membrane contactor and its method of manufacture.

BACKGROUND OF THE INVENTION

A membrane contactor may be used for many purposes, including but not limited to, removing entrained gases from liquids, debubbling liquids, filtering liquids, and adding a gas to a liquid. Membrane contactors are known to be used in many different applications, for example, a membrane contactor may be used in removing entrained gases from inks used in printing. Current designs of membrane contactors are effective for some applications, but do not allow for a contained liquid membrane that is capable of being commercially produced.

Stable liquid membranes have long been the subject of interest to membrane developers because of its proven capacity for very high selectivity in facilitated transport configuration. However, creating a stable liquid membrane has always been an elusive target. The concept of a contained liquid membrane contactor was proposed several years ago to circumvent the stability problem, but making membrane devices with known and repeatable contained liquid membrane effective thickness has proved to be too difficult. Liquid membranes can become more effective if the stability for the membrane could be ensured over a long period of time.

A contained liquid membrane contactor would allow for a stable contained liquid membrane over a significant period of time. Accordingly, there is a need for a contained liquid membrane contactor and a method of its manufacture that allows for commercial production. The device concept presented here allows for the fabrication of stable contained liquid membranes with low production cost.

SUMMARY OF THE INVENTION

A contained liquid membrane contactor includes a perforated center tube, a first mat comprising a plurality of first hollow fiber membranes each having a first end and a second end both being open, a second mat comprising a plurality of second hollow fiber membranes each having a first end and a second end both being open, a first tube sheet, a second tube sheet, a third tube sheet, a fourth tube sheet, a shell, and end caps. The first ends of the first hollow fiber membranes extend a first distance beyond the second ends of the second hollow fiber membranes. The first ends of the second hollow fiber membranes extend a second distance beyond the second ends of the first hollow fiber membranes. The tube sheets affix the first and second membrane mats to the perforated center tube. The first ends of the first hollow fiber membranes are open at the first tube sheet while the first ends of the second hollow fiber membranes are open at the second tube sheet. The second ends of the first hollow fiber membranes are between the second and fourth tube sheets, while the second ends of the second hollow fiber membranes is between the first and third tube sheets. The exterior surfaces of the first hollow fiber membranes are nonporous between the first and third tube sheets, and the exterior surfaces of the second hollow fiber membranes are nonporous between the second and fourth tube sheets. The shell surrounds the first and second mats and is sealed to all of the tube sheets. The shell has a first port between the first and third tube sheets that communicates with the second end of the second hollow fiber membranes. The shell has a second port between the second and fourth tube sheets that communicates with the second end of the first hollow fiber membranes. The first end cap has a third port that communicates with the perforated center tube and a fourth port that communicates with the first end of the first hollow fiber membranes. The second end cap has a fifth port that communicates with the perforated center tube and a sixth port that communicates with the first ends of the second hollow fiber membranes.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
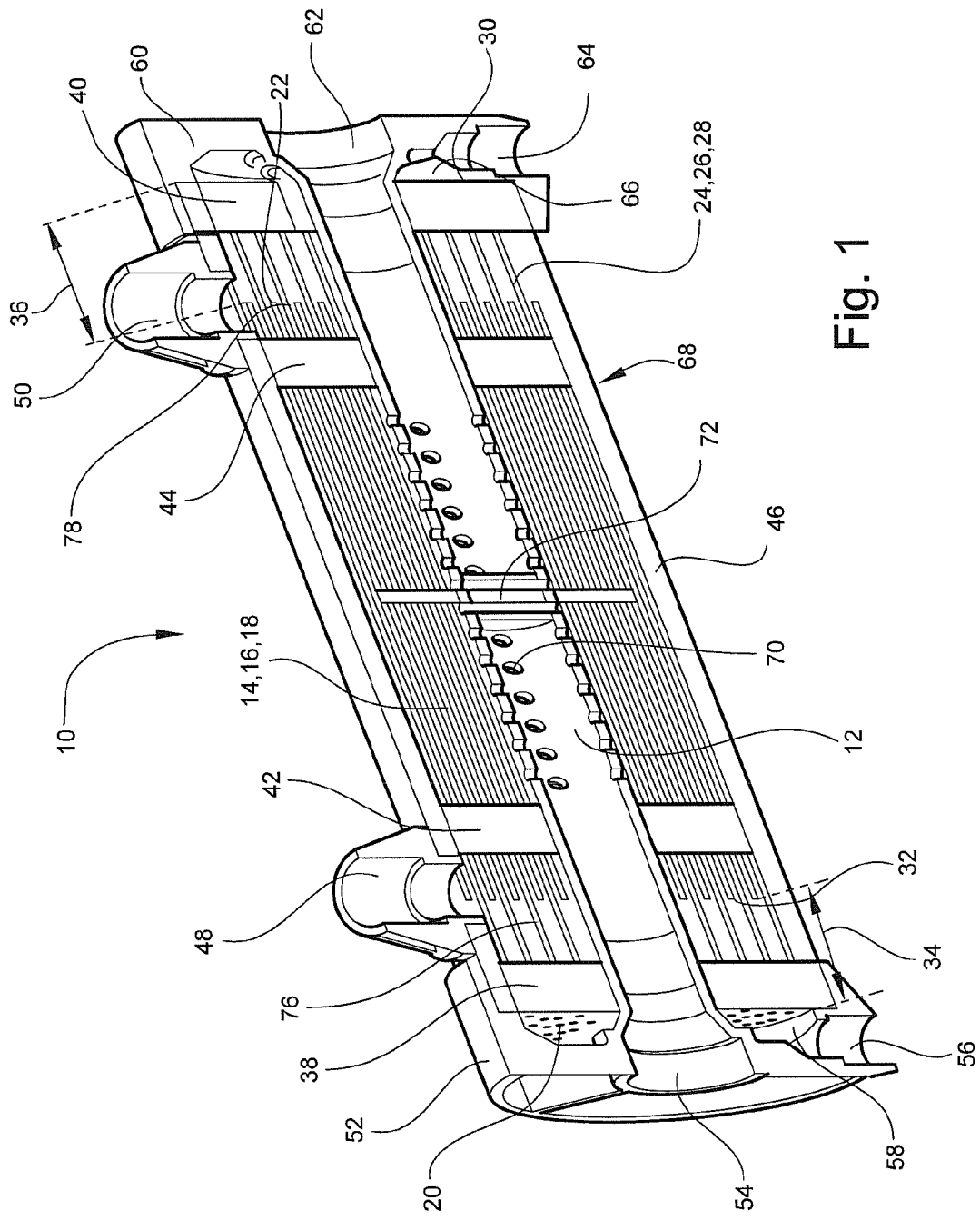
FIG. 1 is a schematic cross-sectional illustration of one embodiment of the instant invention.

Referring to the drawings wherein like numerals indicate like elements, there is shown, in FIG. 1, one embodiment of a contained liquid membrane contactor 10. Contained liquid membrane contactor 10 includes four fundamental components, namely, cartridge 68 (see FIGS. 2 and 3), a shell 46, a first end cap 52, and a second end cap 60, as shown in FIG. 1.

Figure 2:
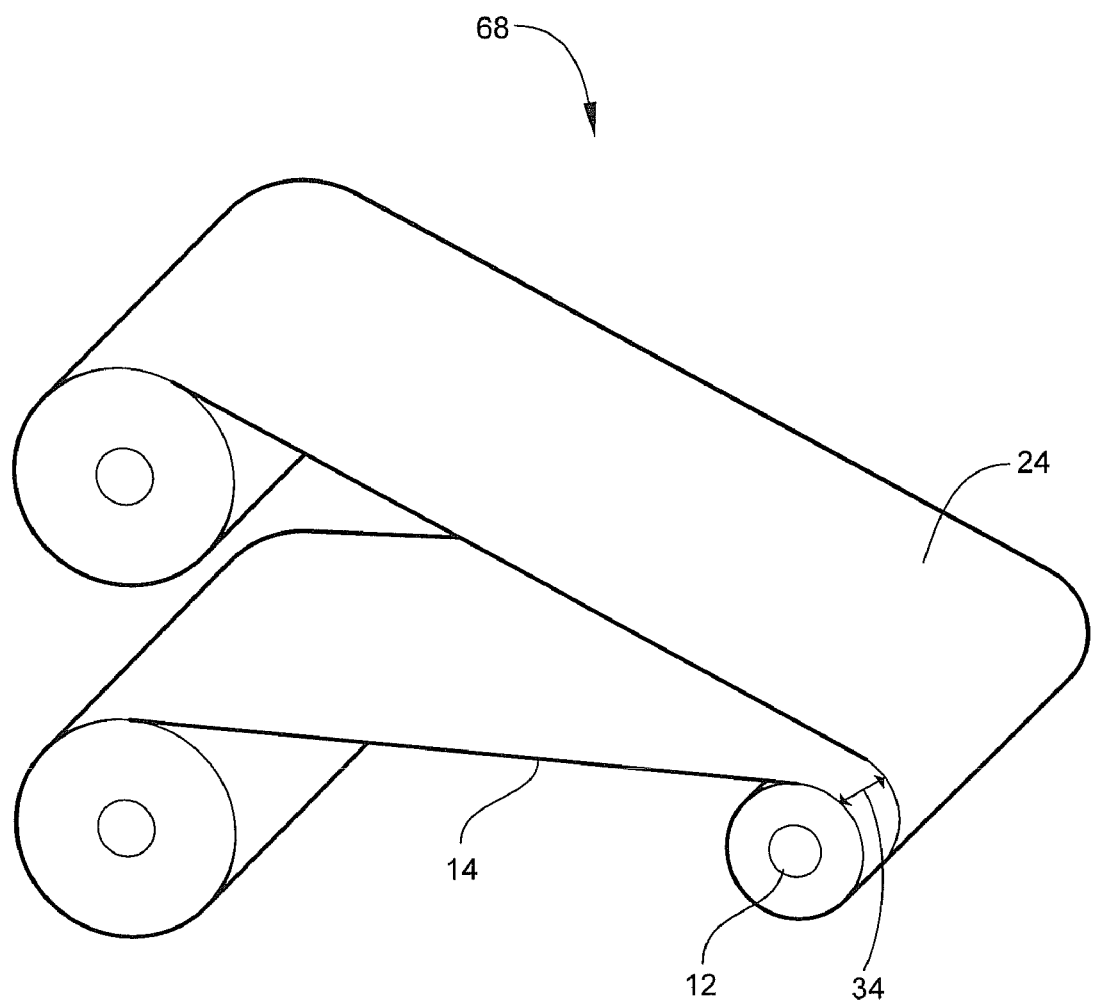
FIG. 2 is a perspective view of the membrane mats from FIG. 1 being wrapped alternatively around the perforated center tube.
Figure 3:
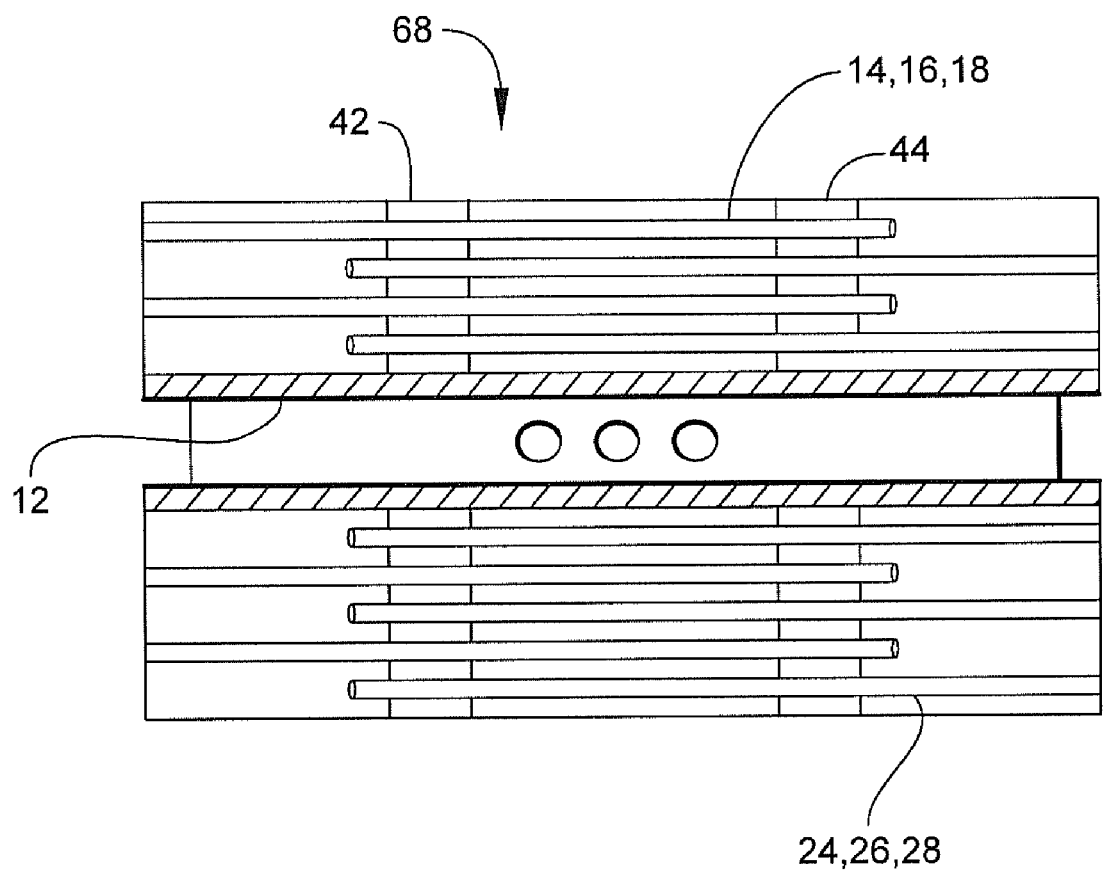
FIG. 3 is a longitudinal cross-sectional view of a cartridge from the embodiment of FIG. 1.

Referring to FIGS. 2 and 3, cartridge 68 may include a perforated center tube 12, a first membrane mat 14, a second membrane mat 24, a third tube sheet 42, and a fourth tube sheet 44. The first and second membrane mats 14 and 24 may be wrapped around perforated center tube 12. The third and fourth tube sheets 42 and 44 may affix the first and second membrane mats 14 and 24 to perforated center tube 12.

Perforated center tube 12 may be made of any material, which possesses sufficient mechanical strength to provide the desired support for the membrane mats 14 and 24. Perforated center tube 12 may be made of a polymeric material, a metal, or a composite material. Perforated center tube 12 may be made of any polyolefin, for example polyethylene. Perforated center tube 12 may include a plurality of perforations 70. Perforations 70 may extend any length of perforated center tube 12, including, but not limited to, the length between third and fourth tube sheets 42 and 44 (see FIGS. 1 and 3). Perforations 70 only extending the length between third and fourth tube sheets 42 and 44 may allow third and fourth tube sheets 42 and 44 to be sealed to shell 46 without the potting material entering perforated center tube 12. Perforated center tube 12 possesses a channel connecting its two ends. The two ends may contain circumferential helical grooves for plugging the perforated center tube 12. Contained liquid membrane contactor 10 may be operated with or without perforated center tube 12 plugged.

The first and second membrane mats 14 and 24 are hollow fiber membrane mats. The first and second membrane mats 14 and 24 may be similar or dissimilar hollow fiber membrane mats. First and second membrane mats 14 and 24 may be each adapted to facilitate a different separation goal, examples of which include, but are not limited to, gas separation, particulate filtration, or heat exchange. First and second mats 14 and 24, as discussed below in further detail, may be dissimilar with respect to their materials of construction, porosity ranges, Gurley number ranges, pore size ranges, and the like. The instant specification describes the instant invention with reference to only two dissimilar membrane mats for convenience only; however, the instant claimed invention is not so limited, and other configurations, for example three or more dissimilar membrane mats, are also included.

First membrane mat 14 may comprise a plurality of first hollow fiber membranes 16. The first membrane mat 14 may have any thickness, i.e. a single layer of first hollow fiber membranes 16 or multiple layers of first hollow fiber membranes 16 arranged atop each other. The first membrane mat 14 may be hydrophobic or hydrophilic. Furthermore, the first membrane mat 14 may be adapted to facilitate the degassing of a fluid; in the alternative, first membrane mat 14 may be adapted to facilitate microfiltration or ultrafiltration of a fluid. The first membrane mat 14 may also be adapted to facilitate the addition of a gas, a liquid, or particles to a fluid. The first membrane mat 14 may be constructed using processes well known in the art. Generally, in hollow fiber mat construction, hollow fiber membranes are knitted or woven into a mat.

The first hollow fiber membrane 16 may have a wall thickness in the range of about 5 to about 1000 μm, a porosity in the range of about 10% to about 80%, and a Gurley number in the range of about 1 to about 2000 seconds/10 cc. Gurley number refers to the time in seconds required to pass 10 cc of air through one square inch of product under a pressure of 12.2 inches of water. Additionally, the first hollow fiber membranes 16 may have any average pore size, for example the first hollow fiber membranes 16 may have an average pore size in the range of about 10 to about 2000 nanometers. The first hollow fiber membrane 16 may be any material, for example a polymer. The polymer, for example, may be any synthetic polymer, cellulose, or synthetically modified cellulose. Synthetic polymers include, but are not limited to, polyethylene, polypropylene, polybutylene, poly (isobutylene), poly (methyl pentene), polysulfone, polyethersulfone, polyester, polyetherimide, polyacrylnitril, polyamide, polymethylmethacrylate (PMMA), Polyetheretherketone (PEEK), ethylenevinyl alcohol, fluorinated polyolefins, copolymers thereof, and blends thereof. The first hollow fiber membranes 16 may be made of polyolefins. The first hollow fiber membrane 16 may be a hydrophobic hollow fiber membrane suitable for gas transfer; in the alternative, the first hollow fiber membrane 16 may be a hydrophilic membrane suitable for particulate microfiltration or ultrafiltration. The first hollow fiber membranes 16 may include a porous or non-porous skin or a coating. The first hollow fiber membranes 16 may be non-porous or their exterior surfaces may be sealed between first tube sheet 38 and third tube sheet 42. Skinned hydrophobic hollow fiber membranes are commercially available, for example, under the trademark OXYPLUS® from Membrana GmbH of Wuppertal, Germany.

The second membrane mat 24 may comprise a plurality of second hollow fiber membranes 26. The second membrane mat 24 may have any thickness, i.e. a single layer of second hollow fiber membranes 26 or multiple layers of second hollow fiber membranes 26 arranged atop each other. The second membrane mat 24 may be hydrophobic or hydrophilic. Furthermore, the second membrane mat 24 may be adapted to facilitate microfiltration or ultrafiltration; in the alternative, the second membrane mat 24 may be adapted to facilitate the degassing of a liquid. The second membrane mat 24 may also be adapted to facilitate the addition of a gas, a liquid, or particles to a fluid. The second membrane mat 24 may be constructed using processes well known in the art. Generally, in hollow fiber mat construction, hollow fiber membranes are knitted or weaved into a mat.

The second hollow fiber membrane 26 may have a wall thickness in the range of about 5 to about 1000 μm, a porosity in the range of about 10 to about 80%, and a Gurley number in the range of about 1 to about 2000 seconds/10 cc. Additionally, the second hollow fiber membranes 26 may have any average pore size, for example the second hollow fiber membranes 26 may have an average pore size in the range of about 10 to about 2000 nanometer. The second hollow fiber membrane 26 may be any material, for example a polymer, as described hereinabove. The second hollow fiber membranes 26 may be made of polyolefins. The second hollow fiber membranes 26 may be hydrophilic hollow fiber membranes suitable for particulate microfiltration or ultrafiltration; in the alternative, the second hollow fiber membranes 26 may be hydrophobic hollow fiber membranes suitable for gas transfer. The second hollow fiber membranes 26 may include a porous or non-porous skin or a coating. The second hollow fiber membranes 26 may be may be non-porous or their exterior surfaces may be sealed between second tube sheet 40 and fourth tube sheet 44. Hydrophilic hollow fiber membranes are commercially available, for example, under the trademark MICROPES® and ULTRAPES® from Membrana GmbH of Wuppertal, Germany.

Generally, each of the first hollow fiber membranes 16 may have a first lumen 18 and each of the second hollow fiber membranes 26 may have a second lumen 28.

First hollow fiber membranes 16 may have a first end 20 and a second end 22 both being open. Second hollow fiber membranes 26 may have a first end 30 and a second end 32 both being open. The first ends 20 of first hollow fiber membranes 16 may be positioned at the external wall of first tube sheet 38. The first end 20 of first hollow fiber membranes 16 may originally be closed, but later machined opened at the first tube sheet 38 to prevent the potting material from entering first hollow fiber membrane 16 during production of first tube sheet 38. The first ends 30 of second hollow fiber membranes 26 may be positioned at the external wall of second tube sheet 40. The first end 30 of the second hollow fiber membranes 26 may be originally closed, but later machined opened at the second tube sheet 40 to prevent the potting material from entering second hollow fiber membranes 26 during product of second tube sheet 40. Second ends 22 and 32 may be originally open because they are not exposed to potting during production, like first ends 20 and 30. The second end 22 of first hollow fiber membranes 16 may be between second tube sheet 40 and fourth tube sheet 44, while the second end 32 of second hollow fiber membranes 26 may be between the first tube sheet 38 and third tube sheet 42, as shown in FIG. 1. The first hollow fiber membranes 16 may be non-porous or their exterior surfaces may be sealed between first tube sheet 38 and third tube sheet 42, while the second hollow fiber membranes 26 may be non-porous or their exterior surfaces may be sealed between the second tube sheet 40 and the fourth tube sheet 44, as shown in FIG. 1. Membranes 16 and 26 exterior surfaces may be sealed between the tube sheets by any method, including, but not limited to, melting membranes 16 and 26 to make them sealed or non-porous. First membranes 16 being non-porous between first and third tube sheets 38 and 42 may allow first port 48 to communicate only with second ends 32 of second membranes 26. Second membranes 26 being non-porous between second and fourth tube sheets 40 and 44 may allow second port 50 to communicate only with second ends 20 first hollow fiber membranes 16.

The first and second membrane mats 14 and 24 may be selected from the group consisting of a leaf mat, a looped mat, a tape mat, and combinations thereof. As used herein, leaf mat refers to a sheet of hollow fiber membranes arranged perpendicular to the length of the leaf mat. A looped mat, as used herein, refers to a folded sheet of hollow fiber membranes arranged perpendicular to the length of the looped mat. In the alternative, a looped mat may be a repeatedly folded single strand of a very long fiber membrane. A tape mat, as used herein, refers to a sheet of hollow fiber membranes arranged parallel to the length of the mat.

Figure 4:
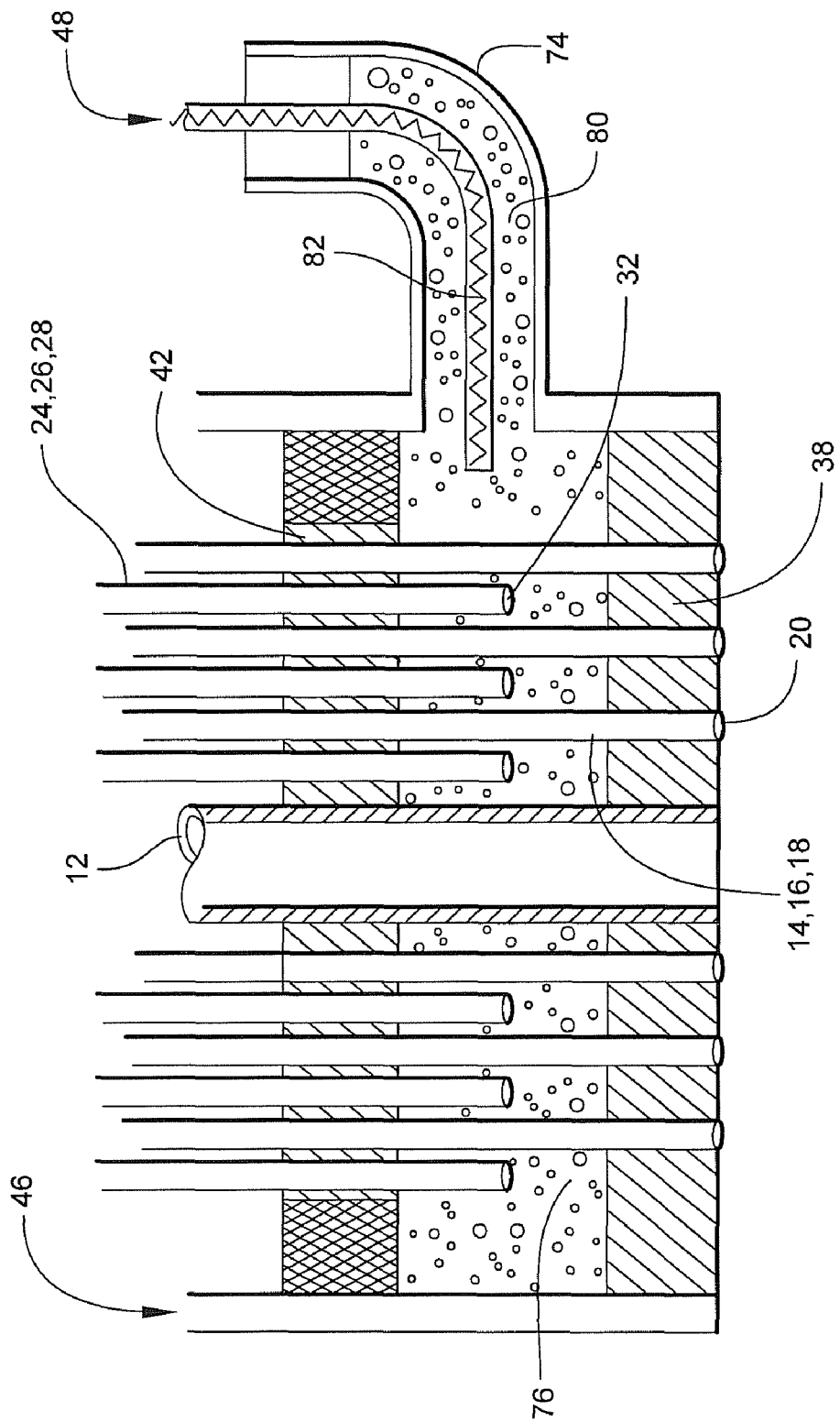
FIG. 4 is a partial cross-sectional view of one embodiment of the step of inserting the boundary fluid and potting material into a port where gravity forces the boundary fluid below the potting material to form the third or fourth tube sheet.

Four tube sheets 38, 40, 42 and 44 may be included in contained liquid membrane contactor 10. The first tube sheet 38 may be located near one end of perforated center tub 12 while the second tube sheet 40 may be located near the other end of perforated center tube 12 (see FIGS. 1 and 3-4). The third tube sheet 42 may be located internally from first tube sheet 38 where the second ends 32 of second hollow fiber membranes 26 may be between the first tube sheet 38 and third tube sheet 42. The fourth tube sheet 44 may be located internally from second tube sheet 40 where the second ends 22 of the first hollow fiber membranes 16 may be between second tube sheet 40 and fourth tube sheet 44.

The four tube sheets 38, 40, 42 and 44 may be cylindrical in cross section with sufficient thickness to provide support for membrane mats 14 and 24 and to withstand the pressure exerted on them during operation. The tube sheets 38, 40, 42 and 44 may be comprised of any material, for example a potting material, which may be a thermoplastic or a thermoset. An exemplary thermoplastic potting material includes, but is not limited to, polyethylene. An exemplary thermoset potting material includes, but is not limited to, an epoxy.

The tube sheets 38, 40, 42 and 44 function to hold membrane mats 14 and 24 in place, and to partition the contained liquid membrane contactor 10. First tube sheet 38 and first end cap 52 may partition contained liquid membrane contactor 10 into a first headspace 58 for fourth port 56 to communicate with first ends 20 of first hollow fiber membranes 16. Second tube sheet 40 and second end cap 60 may partition contained liquid membrane contactor 10 into a second headspace 66 for sixth port 64 to communicate with first ends 30 of second hollow fiber membranes 26. First tube sheet 38 and third tube sheet 42 may partition contained liquid membrane contactor 10 into a third headspace 76 for first port 48 to communicate with second end 32 of second hollow fiber membranes 26. Second tube sheet 40 and fourth tube sheet 44 may partition contained liquid membrane contactor into a fourth headspace 78 for second port 50 to communicate with second end 22 of first hollow fiber membranes 16.

First membrane mat 14 and second membrane mat 24 may be wrapped around perforated center tube 12. First and second membrane mats 14 and 24 may be wrapped in any arrangement around perforated center tube 12, including, but not limited to, in alternative arrangement (see FIGS. 1 and 2). First and second membrane mats 14 and 24 may be wrapped around perforated center tube 12 where the first ends 20 of first hollow fiber membranes 16 may extend a first distance 34 beyond the second ends 22 of second hollow fiber membranes 26. Likewise, first and second membrane mats may be wrapped around perforated center tube 12 where the first ends 30 of second hollow fiber membranes 26 extend a second distance 36 beyond the second ends 22 of first hollow fiber membranes 16. First distance 34 and second distance 36 may, but do not have to be, equal. First distance 34 may be long enough to position first ends 30 of second hollow fiber membranes 26 between first tube sheet 38 and third tube sheet 42. Second distance 36 may be long enough to position first ends 20 of first hollow fiber membranes 16 between second tube sheet 40 and fourth tube sheet 44.

Spacers may be used to maintain the space between the wound layers of the membrane mats 30 and 32 to promote uniform distribution of fluid over their entire surfaces.

A baffle 72 or a plurality of baffles 72 may be positioned within contained liquid membrane contactor 10. Baffles 72 may be for redirecting current or flow into different areas of contained liquid membrane contactor 10. Baffles 72 may be positioned at the center of contained liquid membrane contactor 10 (see FIG. 1).

Referring to FIG. 1, shell 46 may enclose cartridge 68. Shell 46 may include two ports, a first port 48 and a second port 50. Shell 46 may be made of any material. For example, shell 14 may be made of polyethylene, polypropylene, polyvinylidene fluoride (PVDF), polytetrafluoroethylene (PTFE), ethylene copolymer tetrafluoroethylene (ECTFE), fluorinated ethylene polymer (FEP), polyvinyl chloride (PVC), Acrylonitrile-butadiene-styrene (ABS), fiber reinforced plastic (FRP), a metal, or a composite material. Shell 46 may have any length, diameter or size. Shell 46 may be flanged at both its ends. For example, shell 46 may be flanged outwardly at both its ends.

First port 48 may be included in shell 46. First port 48 may be positioned anywhere in shell 46 between first tube sheet 38 and third tube sheet 42. First port 48 may be for communicating with ends 32 of second hollow fiber membranes 26. First port 48 may communicate with second ends 32 of second hollow fiber membranes 26 via third headspace 76. First port 48 may generally be a port, nozzle, fitting, or other opening.

Second port 50 may be included in shell 46. Second port 50 may be positioned anywhere in shell 46 between second tube sheet 40 and fourth tube sheet 44. Second port 50 may be for communicating with second ends 22 of first hollow fiber membranes 16. Second port 50 may communicate with second ends 22 of first hollow fiber membranes 16 via fourth headspace 78. Second port 50 may generally be a port, nozzle, fitting, or other opening.

Referring to FIG. 1, there is shown first and second end caps 52 and 60, respectively. The first end cap 52 may include a third port 54 and a fourth port 56. Third port 54 may be for communicating with perforated center tube 12. Fourth port 56 may be for communicating with first end 20 of first hollow fiber membranes 16. Fourth port 56 may communicate with first end 20 of first hollow fiber membranes 16 via a first headspace 58. The second end cap 60 may include a fifth port 62 and a sixth port 64. Fifth port 62 may be for communicating with perforated center tube 12. Sixth port 64 may be for communicating with first end 30 of second hollow fiber membranes 26. Sixth port 64 may communicate with first end 30 of second hollow fiber membranes 26 via a second headspace 66. Third, fourth, fifth and sixth ports 54, 56, 62 and 64 may each generally be a port, nozzle, fitting, or other opening.

As will be readily apparent to those of ordinary skill, placement of ports may vary.

In construction, the perforated center tube 12 and first and second membrane mats 14 and 24 are first provided. First membrane mat 14 may have a first end 20 that is originally closed and a second end 22 that is open. Second membrane mat 24 may have first ends 30 that are originally closed and second ends 32 that are open. First hollow fiber membranes 16 and second hollow fiber membranes 26 may first be made non-porous or their exterior surfaces may be sealed at specific locations. First hollow fiber membranes 16 may be non-porous equal to or greater than the third headspace 76, which is equal to or greater than the distance between the first and third tube sheets 38 and 42. Second hollow fiber membranes 26 may be non-porous equal to or greater than fourth headspace 78, which is equal to or greater than the distance between the second and fourth tube sheets 40 and 44. First and second hollow fiber membranes 16 and 26 may be made non-porous or have their exterior service sealed by any means, including, but not limited to heating or melting the membranes. The first and second membrane mats 14 and 24 may then be alternatively wrapped around perforated center tube 12 (see FIG. 2). The mats 14 and 24 may be wrapped so that first end 20 of first hollow fiber membranes 16 extend a first distance 34 beyond second end 32 of second hollow fiber membranes 26 and first end 30 of second hollow fiber membranes 26 extend a second distance 36 beyond second end 22 of first hollow fiber membranes 16 (see FIGS. 1-3). Next, third and fourth tube sheets 42 and 44 may be created via a potting material. The winding of membrane mats 14 and 24 and potting steps of third and fourth tube sheets 42 and 44 may be performed simultaneously. This structure, cartridge 68 (see FIG. 3), may then be disposed within shell 46. Next, contained liquid membrane contactor 10 may be turned on one of its ends in order to create first tube sheet 38 and sealing third tube sheet 42 to shell 46 or to second tube sheet 40 and sealing fourth tube sheet 44 to shell 46. It should be appreciated that the order of creating first tube sheet 38 and sealing third tube sheet 42 to shell 46 can be reversed with creating second tube sheet 40 and sealing fourth tube sheet 44 to shell 46. First tube sheet 38 may then be created by first turning the shell on its end relative to third tube sheet 42. Next, a potting material is inserted into the shell via first port 48. The shell is then stabilized until the potting material is cured thereby making first tube sheet 38. The first tube sheet 38 may then be machined or cut thereby making first ends 20 of first hollow fiber membranes 16 open. Next, a boundary fluid 80 and potting material 82 may be inserted into first port 48 on top of first tube sheet 38 (see FIG. 4). The boundary fluid 80 may be denser than the potting material 82 so that gravity may force the boundary fluid below the potting material. The amount of boundary fluid 80 added can be determined via an elevated tube with markings 74 (see FIG. 4). Next, contained liquid membrane contactor 10 may be stabilized until the potting material is cured thereby sealing third tube sheet 42 to shell 46 and making third headspace 76. Next, the boundary fluid 80 may be drained or removed. Next, contained liquid membrane contactor 10 may be turned on its other end relative to fourth tube sheet 44. Second tube sheet 40 may then be created by inserting a potting material into the shell 46 via second port 50. The shell 46 is then stabilized until the potting material is cured thereby making second tube sheet 40. The second tube sheet 40 may then be machined or cut thereby making first ends 30 of second hollow fiber membranes 26 open. Next, the boundary fluid 80 and potting material 82 may then be inserted into second port 50 on top of second tube sheet 40. The boundary fluid 80 may be denser than the potting material 82 so that gravity may force the boundary fluid below the potting material. The amount of boundary fluid 80 added can be determined via an elevated tube with markings 74 (see FIG. 4). Next, the contained liquid membrane contactor 10 may be stabilized again until the potting material may be cured, thereby sealing or attaching fourth tube sheet 44 to shell 46 and making fourth headspace 78. Next, the boundary material may again be drained or removed. Finally, first and second end caps 52 and 60 may be adjoined to their respective shell ends, thereby, forming first headspace 58 and second headspace 66 therebetween first and second tube sheets 38 and 40 and end caps 52 and 60, respectively.

One of the primary applications for contained liquid membrane contactor 10 would be to use it as a contained liquid membrane separation module. Contained liquid membrane separation modules can be used to treat both gaseous feeds or liquid feeds. In the latter case the contained liquid membrane phase is chosen so that it is immiscible with two liquid phases. For example, in a gas separation process, by using a liquid with high permselective characteristics on the shell side (via third port 54 and fifth port 62) as a contained liquid membrane, one gas species could be removed very selectively from a feed gas mixture via first hollow fiber membranes 16 through second port 50 and fourth port 56. The other gas phase could be a sweep gas or it could be operated under vacuum to create the driving force for separation via second hollow fiber membranes 26 through first port 48 and sixth port 64. Similarly, a species from a liquid feed could be removed with high selectivity using the right liquid as the contained liquid membrane via third port 54 and fifth port 62. The other liquid phase could be a sweep liquid or it could be a reactive liquid that reacts with the said species to increase driving force for separation. Any loss of the membrane liquid due to evaporation or extraction into the flowing phases is automatically replenished since the shell side could be kept connected to a slightly pressurized source of the membrane liquid either via third port 54 or fifth port 62 or via both ports.

The contained liquid membrane contactor 10 can be operated as a gas separation device, a liquid separation device, a membrane reactor, or a pervaporation device. Sample applications include O2 enrichment of air, removal of toxic gas species such as H2S, NH3, SO2 and NOx from air, removal of toxic organics such as phenol from water, removal of CO2 from biogas to increase biogas fuel value, separation of toxic metals from metal plating bath, recovery of precious metals, selective extraction of specific species from liquid or gas samples for detection or measurement purpose, etc. The two sets of hollow fiber membranes 16 and 26 within whose interstices the liquid membrane is contained may be similar or dissimilar. They could be made of different morphologies, or sizes, or materials, and of different properties and functionalities. As a result, the potentials for various applications of contained liquid membrane contactor 10 are very high.

It is important to note that contained liquid membrane contactor 10 could be used for applications other than as a contained liquid membrane contactor if the shell side (via third port 54 and fifth port 62) phase is also a mobile phase. It could also be used as a bifunctional device, combining filtration and other separation processes for example, or for combined mass and heat transfer. Additionally, fibers of two different sizes or types could be used allowing any number of combination applications.

Yet another application is to use contained liquid membrane contactor 10 for moisture transfer between two gas streams. If, for example, you had one air stream at a relatively high dew point in first hollow fiber membranes 16 via second port 50 and fourth port 56 and another air stream at a low dew point in second hollow fiber membranes 26 via first port 48 and sixth port 64, you could put a water supply in the shell side at a temperature between these two dew points as the contained liquid membrane via third port 54 and fifth port 62.

The present invention may be embodied in other forms without departing from the spirit and the essential attributes thereof, and, accordingly, reference should be made to the appended claims, rather than to the foregoing specification, as indicated in the scope of the invention.

We claim:

1. A contained liquid membrane contactor comprising:

a perforated center tube;

a baffle;

a first membrane mat comprising a plurality of first hollow fiber membranes having a first lumen with a first end and a second end both being open;

a second membrane mat comprising a plurality of second hollow fiber membranes each having a second lumen with a first end and a second end both being open;

said first mat and said second mat being wrapped alternately around said center tube where said first end of said first hollow fiber membranes extending a first distance beyond said second end of said second hollow fiber membranes and said first end of said second hollow fiber membranes extending a second distance beyond said second end of said first hollow fiber membranes;

a first tube sheet and a second tube sheet affixing said first and second membrane mats to said perforated center tube, said first end of said first hollow fiber membranes being open at said first tube sheet while said first end of said second hollow fiber membranes being open at said second tube sheet;

a third tube sheet and a fourth tube sheet affixing said first and second membrane mats to said perforated center tube, said second end of said second hollow fiber membranes being between said first and third tube sheet, while said second end of said first hollow fiber membranes being between said second and fourth tube sheets;

said first hollow fiber membranes being non-porous between said first and third tube sheets, and said second hollow fiber membranes being non-porous between said second and fourth tube sheets;

said perforated center tube having a plurality of perforations between said third and fourth tube sheets;

a shell surrounding said first and second mats and being sealed to all of said tube sheets;

said shell having a first port between said first and fourth tube sheets communicating with said second end of said second hollow fiber membranes;

said shell having a second port between said second and third tube sheets communicating with said second end of said first hollow fiber membranes;

a first end cap having a third port communicating with said perforated center tube and a fourth port communicating with said first ends of said first hollow fiber membranes;

said first tube sheet and said first end cap defining a first headspace; and a second end cap having a fifth port communicating with said perforated center tube and a sixth port communicating with said first ends of said second hollow fiber membranes;

said second tube sheet and said second end cap defining a second headspace;

at least one of said third port and said fifth port being pressurized.

2. The contained liquid membrane contactor according to claim 1 where said first headspace being adapted for allowing said fourth port to communicate with said first ends of said first hollow fiber membranes.

3. The contained liquid membrane contactor according to claim 1 where said second headspace being adapted for allowing said sixth port to communicate with said first ends of said second hollow fiber membranes.

4. The contained liquid membrane contactor according to claim 1 where said first tube sheet and said third tube sheet defining a third headspace.

5. The contained liquid membrane contactor according to claim 4 where said third headspace being adapted to allow said first port to communicate with said second ends of said first hollow fiber membranes.

6. The contained liquid membrane contactor according to claim 1 where said second tube sheet and said fourth tube sheet defining a fourth headspace.

7. The contained liquid membrane contactor according to claim 6 where said fourth headspace being adapted to allow said second port to communicate with said second ends of said second hollow fiber membranes.

8. The contained liquid membrane contactor according to claim 1 further comprising a membrane liquid contained between said third port and said fifth port.

9. The contained liquid membrane contactor according to claim 8 where said membrane liquid being contained between said third port and said fifth port via a slightly pressurized source of said membrane liquid.

10. The contained liquid membrane contactor according to claim 9 where said slightly pressurized source of said membrane liquid being connected to said third port or said fifth port or both.

* * * * *